United States Patent [19]
Kumagai et al.

[11] Patent Number: 5,743,989
[45] Date of Patent: Apr. 28, 1998

[54] METHOD OF WELDING PLASTICS SHEETS TOGETHER AND A JOINT USED THEREIN

[75] Inventors: Masaru Kumagai; Toshikazu Nishimura, both of Osaka, Japan

[73] Assignee: Toua Kokyu Tugitevarubu Seizo Co., Ltd., Osaka, Japan

[21] Appl. No.: 571,655

[22] Filed: Dec. 13, 1995

[30] Foreign Application Priority Data

Nov. 8, 1995 [JP] Japan ................................ 7-316146

[51] Int. Cl.$^6$ ................................ B32B 31/26; H05B 3/10; H05B 3/44
[52] U.S. Cl. ................................ 156/273.9; 156/272.2; 156/304.3; 156/304.6; 219/544; 219/547; 219/548
[58] Field of Search ................................ 156/272.2, 273.9, 156/274.4, 275.1, 304.1, 304.3, 304.5, 274.2, 379.7, 304.6; 219/544, 547, 548, 539, 535, 542, 553

[56] References Cited

U.S. PATENT DOCUMENTS

| | | | |
|---|---|---|---|
| 2,388,297 | 11/1945 | Slaughter | 156/304.5 X |
| 2,983,306 | 5/1961 | Resnick. | |
| 4,938,820 | 7/1990 | McMills | 156/273.9 X |

FOREIGN PATENT DOCUMENTS

| | | | |
|---|---|---|---|
| 1 026 223 | 4/1966 | United Kingdom | 156/273.9 |
| 1 366 299 | 9/1974 | United Kingdom | 156/273.9 |
| 94/14599 | 7/1994 | WIPO | 156/273.9 |

*Primary Examiner*—Curtis Mayes
*Attorney, Agent, or Firm*—Fisher, Christen & Sabol

[57] ABSTRACT

Plastics sheets having edges to be bonded one to another as well as a plastics joint having at least two weldable regions are prepared, each region having an embedded wire extending along the region. Subsequently, the plastics sheet edges are placed on or in the weldable regions, and an electric current is supplied through the wires to emit heat for fusion bonding each edge to the corresponding weldable region. Alternatively, each of the plastics sheets has at least one edge having an embedded wire so that they are welded to each other, without aid of any joint. The joint has U-shaped grooves or ear-shaped protrusions adapted to engage with the plastics sheet edges, and the wires are embedded in the grooves or protrusions.

3 Claims, 13 Drawing Sheets

METHOD OF WELDING PLASTICS SHEETS TOGETHER AND A JOINT USED THEREIN

BACKGROUND OF THE INVENTION

1. Field of the Invention

The present invention relates to a method of welding or fusion bonding sheets, films or panels all made of a thermoplastic resin, and also relates a joint used in the method.

2. Prior Art

There is known a certain method of fusion bonding two plastics sheets such as polyethylene sheets, wherein a hot plate is interposed between their lateral edges and driven along same. An extensive sheet thus prepared is used to make watertight a variety of equipments or structures, for example garbage pits, water reservoirs, swimming pools, office buildings and housings.

In the prior art method, all the surface regions of polyethylene sheet edges to be welded do not melt simultaneously in a short time. Thus, the bonding works not only require much labor and much time, but also those regions cannot be heated evenly to ensure a satisfactory and reliable bonding strength all over the welded regions.

SUMMARY OF THE INVENTION

An object of the present invention made in view of those drawbacks is to provide an advanced method of welding plastics sheets or the like one to another with a reduced labor and in a shortened time, such that surface regions of the sheets or the like are heated evenly to afford a reliable high bonding strength.

In one preferable mode of the present invention, the following steps are carried out, namely: preparing at first plastics sheets having edges to be bonded one to another as well as a plastics joint having at least two weldable regions, the plastics joint also having a conductive linear member embedded in and extending along each weldable region from end to end; subsequently placing the edges of the plastics sheets onto the weldable regions of the joint; and finally supplying an electric current to the conductive linear members so as to heat same and thereby fusion bond each plastics sheet edge to the corresponding weldable region of the joint.

The joint made of a plastics and having a structure summarized above is also provided herein, wherein the joint is an elongate band-shaped member having at least two weldable regions that extend along the joint and have each a conductive linear member, such as an electric wire embedded in the region from end to end and capable of being heated by an electric current supplied therethrough.

In another preferable mode of the present invention, the following steps are carried out, namely: preparing at first plastics sheets mating one another such that one of them having at least one edge to be brought into contact with and to be bonded to an edge of the other sheet, the at least one edge having a conductive linear member embedded in and extending along the edge from end to end; subsequently placing the edges of the plastics sheets onto each other; and finally supplying an electric current to the conductive linear members so as to heat same and thereby fusion bond the edges of the plastics sheets one to another.

DETAILED DESCRIPTION OF THE PREFERRED EMBODIMENTS

Now, a first mode of the method of welding plastics sheets will be described in detail referring to joints that are shown in FIGS. 1 to 12 and 19.

The joint 1 of one type provided in a first embodiment and shown in FIGS. 1 to 5 is socket-shaped. This joint is made of an elongate plastics belt or band, and has a pair of grooves 3 of a U-shape. Those grooves 3 are opened in opposite directions and included in a common plane. A lateral edge of each plastics sheet 2 can fit in said groove, over its full length.

Width of each groove 3 is equal to the thickness of the plastics sheets 2. Each of side walls defining between them the groove is also of a thickness substantially equal to that of said plastics sheets.

Inner surfaces 3a and 3b of the groove side walls are intended to respectively come into close contact with a front and rear surfaces of the plastics sheet 2 inserted in each groove 3. An electric wire 4 as a conductive linear member extends straight from end to end of the joint 1. Those wires 4 embedded in the side walls 3a and 3b are capable of generating heat when an electric current is supplied.

Figure 1:
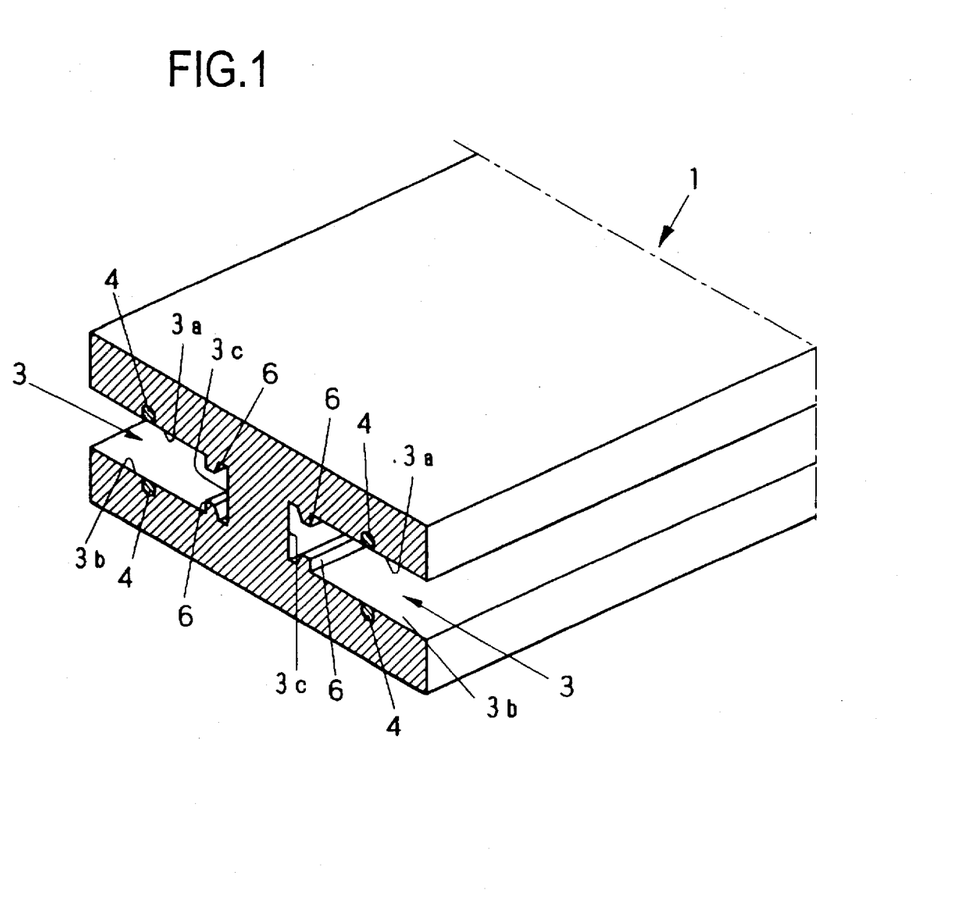
FIG. 1 is a fragmentary perspective view of a joint provided in a first embodiment and used in an example of first mode of the method proposed herein to weld plastics sheets.
Figure 2:
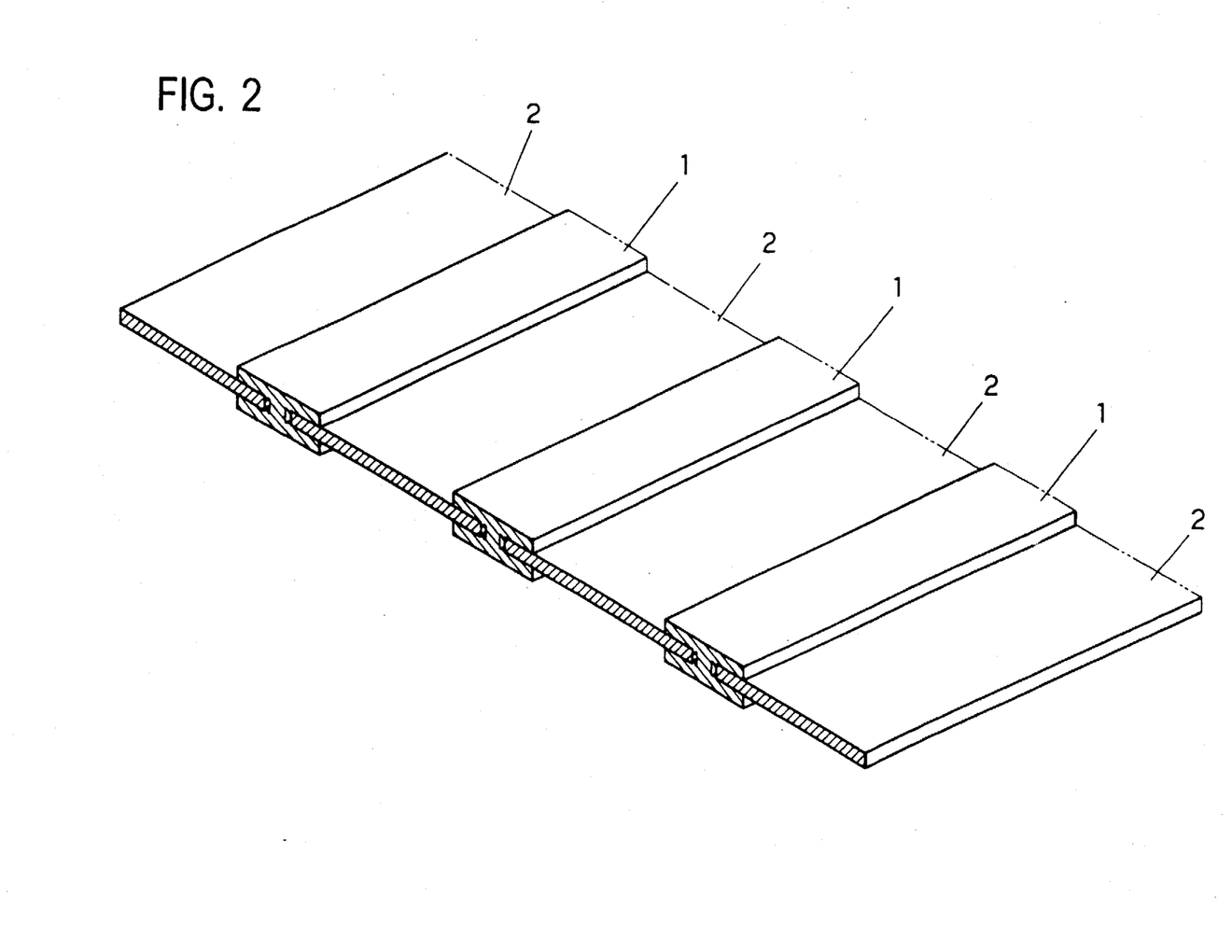
FIG. 2 is a perspective view of the plastics sheets welded together in one example of the first mode using the joint shown in FIG. 1.
Figure 3:
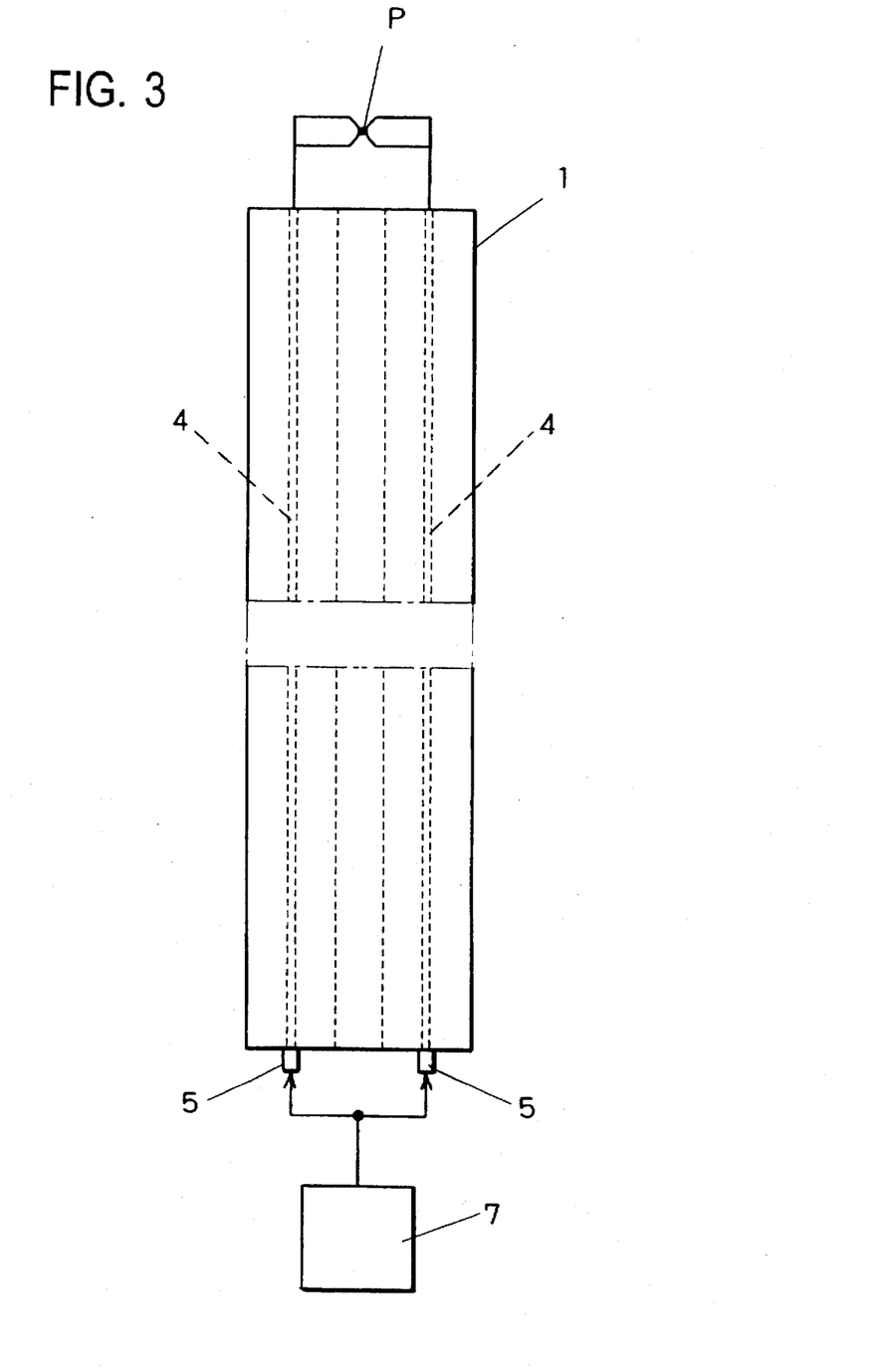
FIG. 3 is a plan view of the joint.
Figure 4:
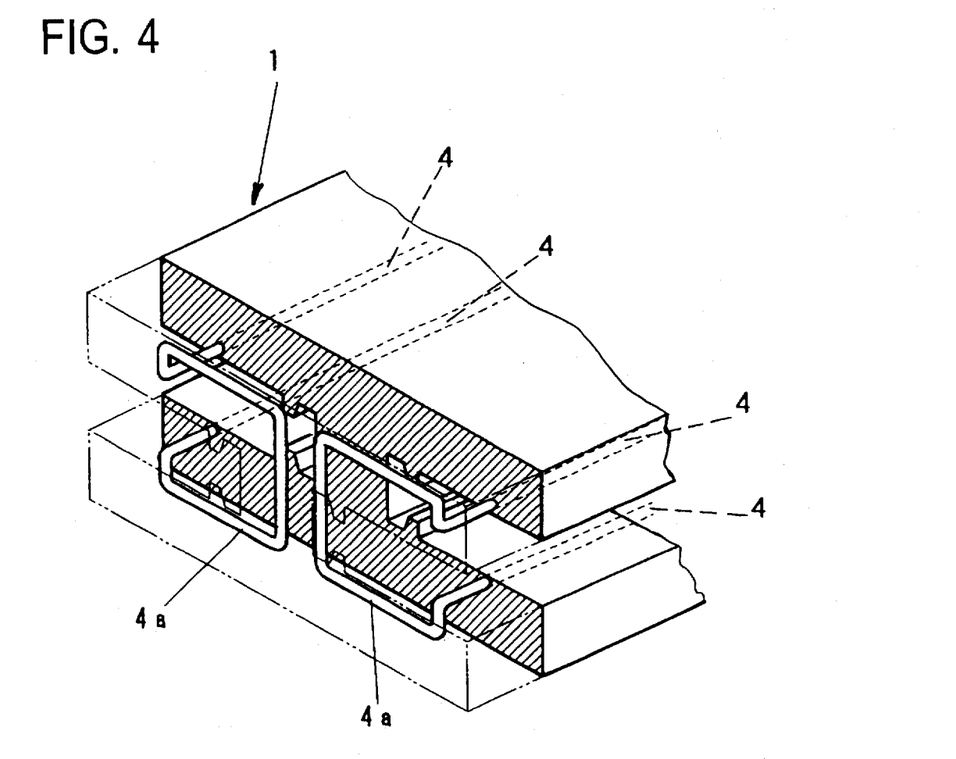
FIG. 4 is a fragmentary perspective view of a modified type of the joint shown in FIG. 1.
Figure 5:
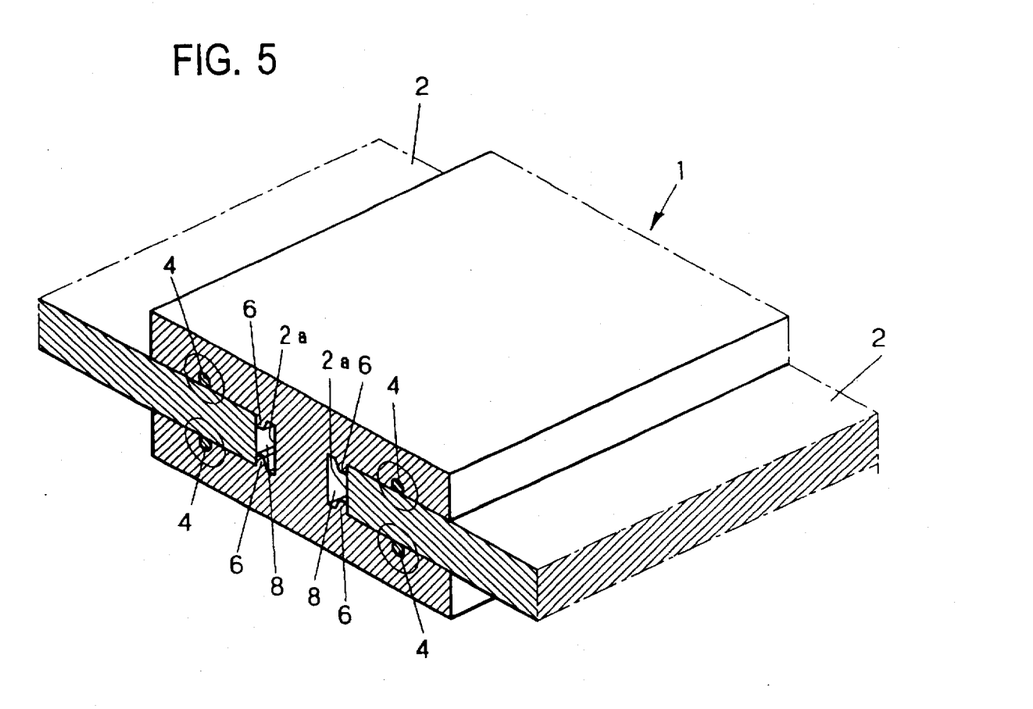
FIG. 5 is a fragmentary and enlarged perspective view of the plastics sheets welded together using the joint in the first embodiment.

A terminal pin 5 soldered to an end of each wire 4 protrudes from one of the ends or shorter sides of belt-shaped joint 1. Other ends of the four wires 4 protrude from the other shorter side, and are connected one to another to provide a node 'P'. FIG. 4 shows the joint 1 of a modified type, in which a pair of the upper and lower parallel wires 4 for each groove are connected in series one to another. This connection is realized through their U-turn portion 4a located inside and adjacent to the one shorter side. Two unit joints can thus be butt welded, on demand, at their facing ends so as to provide an extended joint that is twice as long as the unit joints.

The electric wires 4 as the conductive linear members embedded in the joints may be lengths of 'Nichrome' wire (registered trademark) or the like material for emitting Joule heat.

The joints shown in FIGS. 1 to 4 have stoppers 6 and 6 formed integral with and protrude from the inner surfaces 3a and 3b. Those stoppers 6 are located deeper than the wires 4 so that an inner end 2a of each plastics sheet 2 is prevented from bearing against a bottom 3c of each groove 3. A small vacant space 8 will thus appear between them 2a and 3c.

To prepare the joints 1 described above, an extruder may be used which has a die of the same cross-sectional shape as said joints. A plastics used to extrude those joints may be the same as that which forms the plastics sheets 2. The electric wires 4 may be inserted in the joints 1 simultaneously with the extrusion of same.

In the first mode of the method of welding plastics sheets 2 one to another by means of the joint 1, operations will be done in the following manner. At first, one lateral sides of two plastics sheets will be put into the grooves 3 of the joint, until they will bear against the stoppers 6. After the full length of lateral side of each sheet 2 is inserted in the groove, and two sheets are set in this position, a fusion controller 7 will be operated to supply each wire 4 with a current of desired intensity. Such a current fed through the terminal pin 5 for a predetermined duration will generate Joule heat much enough to melt the surface layers of the joint and the sheets. These layers are a couple of one side wall 3a in the joint groove 3 and the front edge face of each sheet 2, and another pair of the other side wall 3b and the rear edge face of said sheet. Such surface layers in contact with each other will thus be fusion bonded instantaneously over their full length. According to this method, heat is given evenly to all the surface layers contacting one another, so that a high and reliable bonding strength is ensured free of any unbonded regions or zones.

The vacant space 8 formed between the inner end 2a of each sheet and the groove bottom 3c of the joint 1 extends from one side end of the groove 3 to the other side end thereof. Therefore, compressed air may be introduced in the space 8 in order to inspect the completeness of fusion bond in longitudinal direction of the joint. Alternatively or additionally, a tester may be used to charge a high voltage across the bonded sheet surfaces where the wires 4 are embedded. Irregularity in dielectric characteristics will indicate a defect in fusion bond.

The welding described above and carried out after preparation of the sheets and joints needs only two steps of operation, namely the setting of plastics sheets 2 in the grooves of the joint 1, and the supplying of an electric current through the wires for several tens of seconds or for a few minutes.

The melting temperature of joint 1 and sheets 2 will vary depending on the material thereof. The length of time required to melt the surface regions of said joint and sheets will also vary depending on thickness thereof and ambient temperature. The controller 7 will thus have to adjust the intensity of electric current as well as the duration thereof. Such a control is also effective to protect the welded regions from heat degradation.

Preferably, the electric wire 4 is disposed along the center line of a fusion bond area between the joint 1 and the sheet 2. A plurality of parallel wires 4 or a single meandering wire may be embedded in each of joint's regions where fusion bond is to be effected, so that an entire surface of such region may be molten. Each wire 4, exemplified above as a bare wire, may however be coated with the same plastics as that from which the sheets 2 are made. The wires 4 may not be embedded fully in the side walls of joint 1, but may be partially exposed to the interior of the joint's groove 3.

Figure 19:
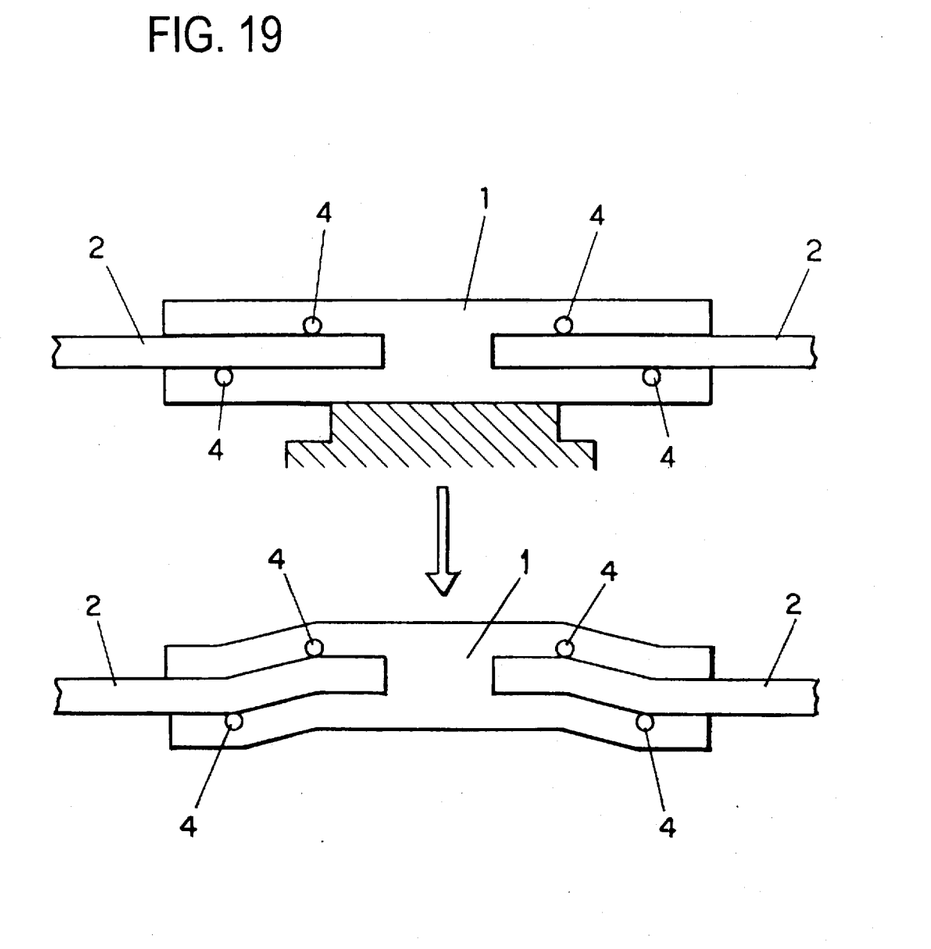
FIG. 19 is a side elevation of the joint and the plastics sheets that are being and have been welded one to another, in which the joint is of a modified type of that used in the first mode referred to above.

FIG. 19 shows a modified type of the joint 1 used in the first mode referred to above. In this joint, the wire 4 for the front surface of the sheet edge and that wire 4 for the rear one are disposed in a staggered relationship. This arrangement of wires will cause a bending stress to the regions when the same are fusion bonded. A curved deformation as illustrated in the lower portion of FIG. 19 will thus be produced in said region, thereby improving the welding strength.

Figure 6:
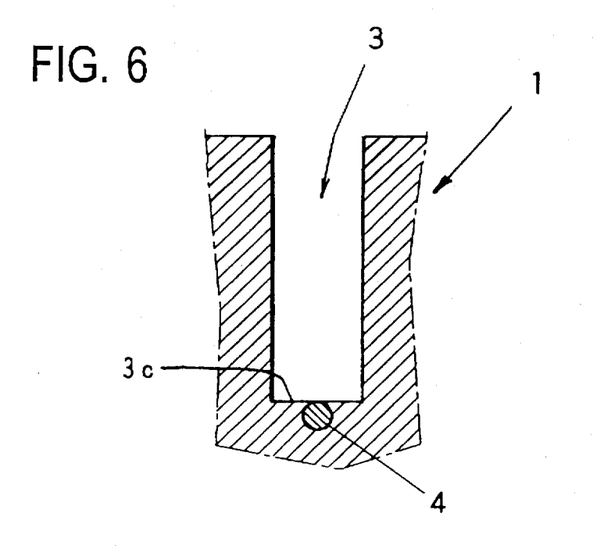
FIG. 6 is a fragmentary cross-sectional view of another modified type of the joint, showing a groove thereof.

FIG. 6 shows another modified type of the joint 1, in which a further straight electric wire 4 is embedded in the groove bottom 3c. In addition to the front and rear edge surfaces weldable in the aforedescribed joints, an end surface 2a of each plastics sheet 2 is also fusion-bondable to said bottom. There are no stoppers 6 formed on the side walls of the groove 3 in this case.

Figure 7:
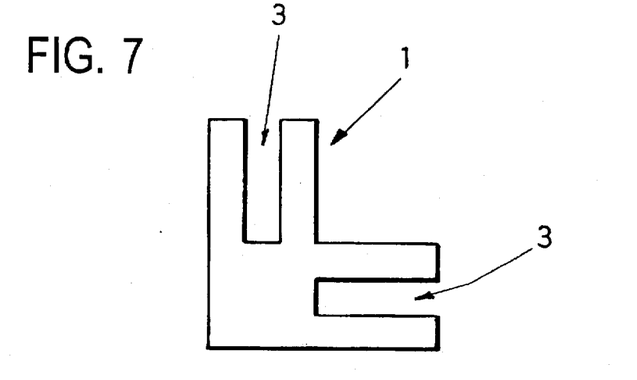
FIG. 7 is a side elevation of still another modified type of the joint.
Figure 8:
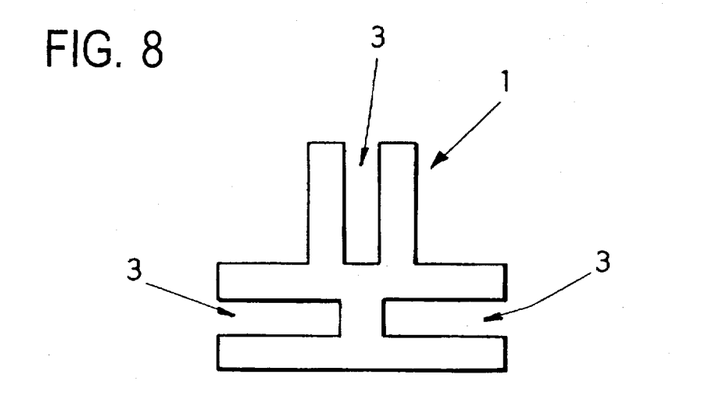
FIG. 8 is also a side elevation of a further modified type of the joint.
Figure 9:
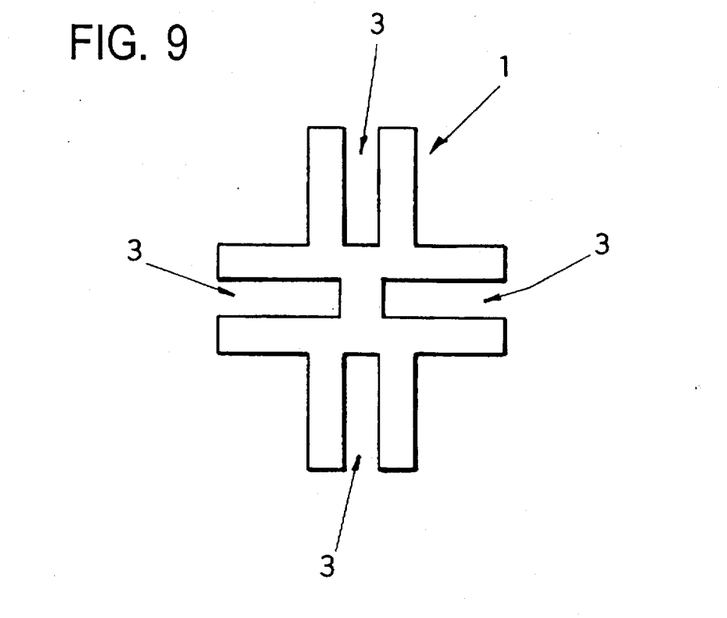
FIG. 9 is a side elevation of a still further modified type of the joint.

The joint 1 need not necessarily be socket-shaped as shown above. FIG. 7 shows still another modified type of the joint elbow-shaped such that two plastics sheets 2 are connected perpendicular one to another. FIG. 8 shows a further modified type of the joint that is T- or Y-shaped so as to combine three plastics sheets 2, whilst FIG. 9 shows a still further modified type of the joint of a cruciform section adapted to connect four plastics sheets 2. The joint 1 may be designed to be of any other shape suited to the number and directions of the plastics sheets, as is the case in the waterworks or gas fitting works.

Figure 10:
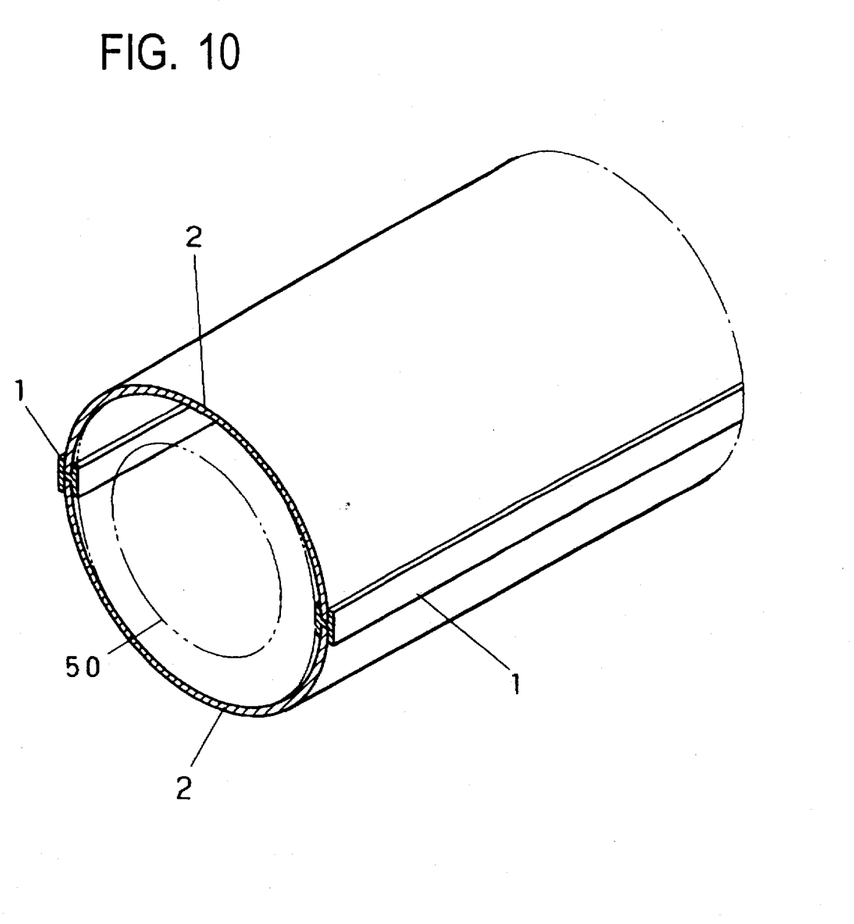
FIG. 10 is a perspective view of the plastics sheets welded together in a further example of the mode using the joint shown in FIG. 1.

FIG. 10 illustrates two plastics sheets 2 welded together in a further example of the first mode of the present invention, in which two joints 1 shown in FIG. 1 are used to form a cylinder or tube. This cylinder may be useful to form a coaxial bypass around an existing metal pipe 50, in a case wherein that the pipe cannot be repaired to have its inner periphery coated with a resin lining or cannot be removed or broken.

Figure 11:
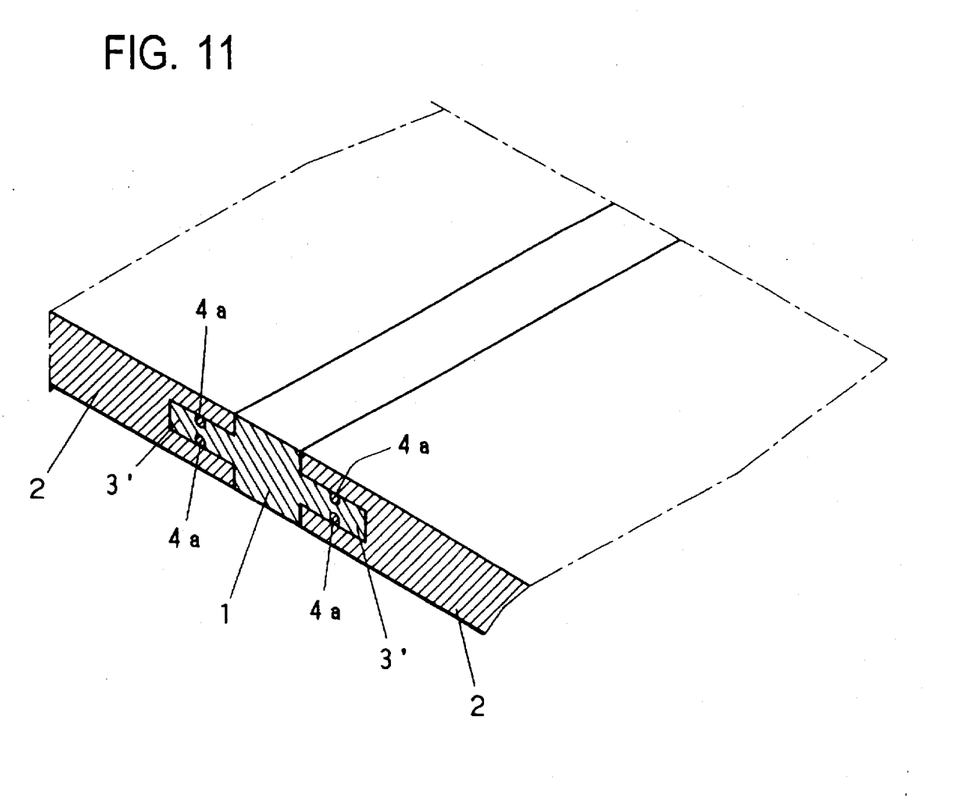
FIG. 11 is a fragmentary perspective view of a joint provided in a second embodiment and used in the first mode of the aforementioned method.
Figure 12:
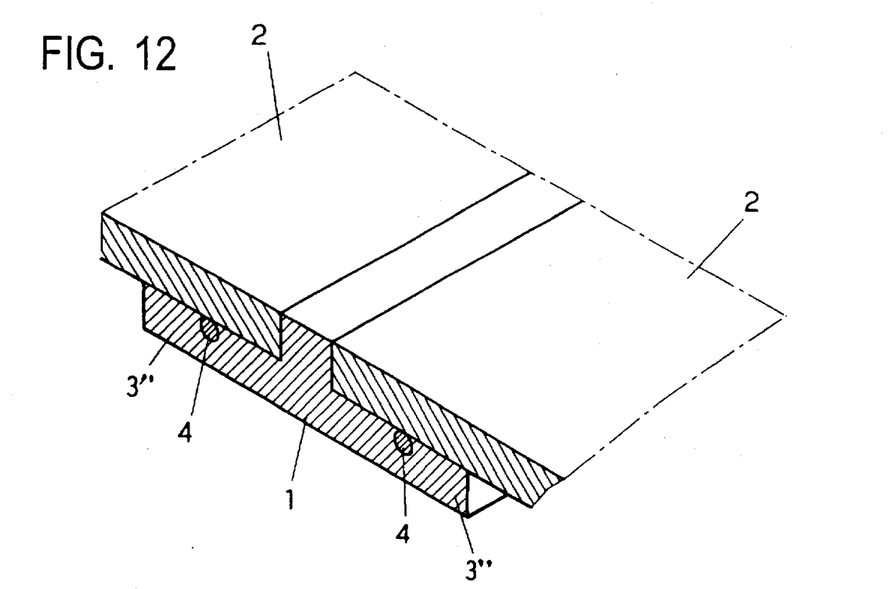
FIG. 12 is also a fragmentary perspective view of a modified type of the joint shown in FIG. 11.
Figure 13:
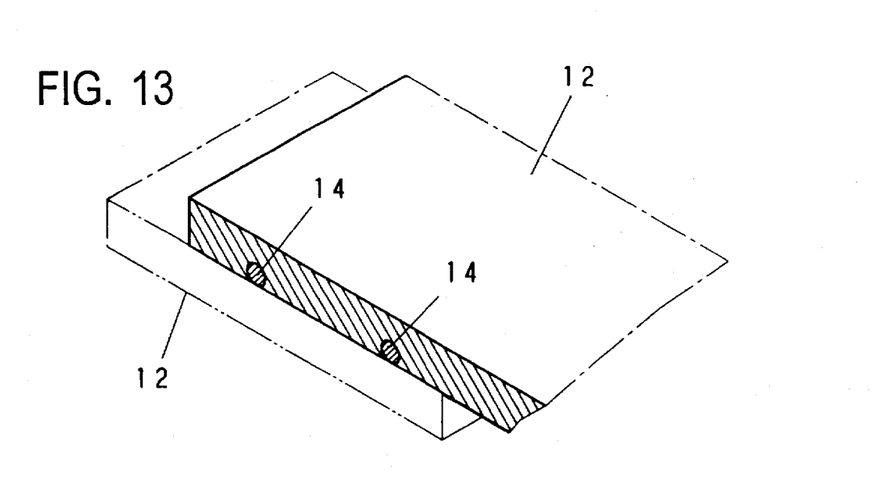
FIG. 13 is a fragmentary perspective view of the plastics sheets to be welded together, without aid of any joint, in one example of a second mode of the method proposed herein.
Figure 14:
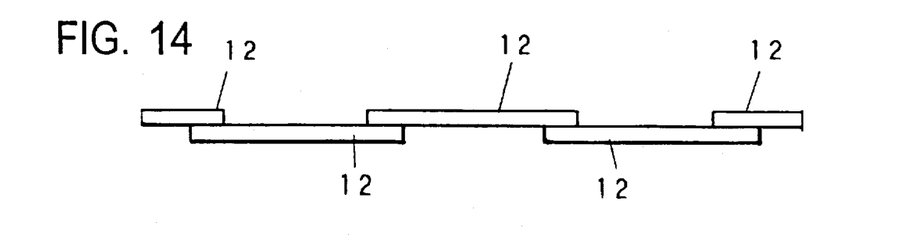
FIG. 14 is a side elevation of the plastics sheets that have been welded in the second mode.
Figure 15:
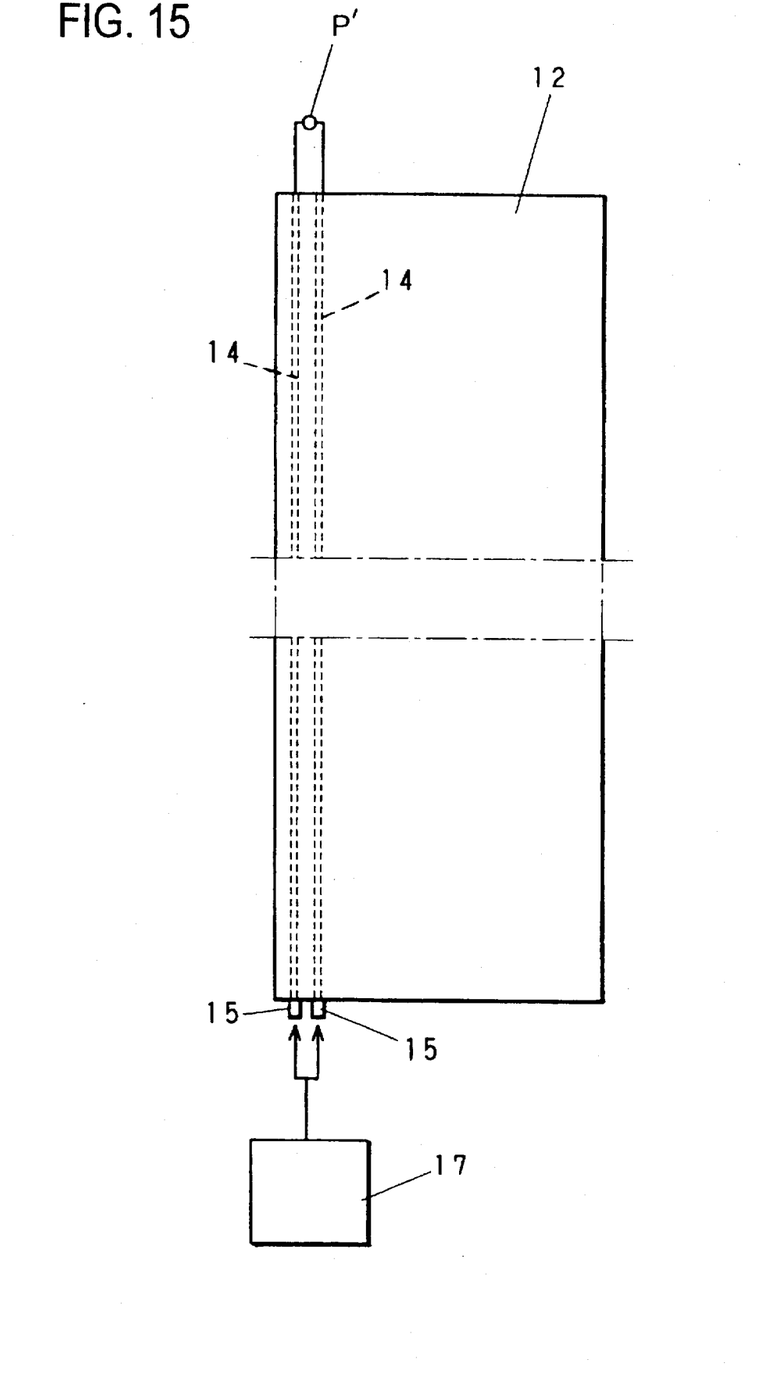
FIG. 15 is a plan view of one plastics sheet to be welded to the other, in the second mode.
Figure 16:
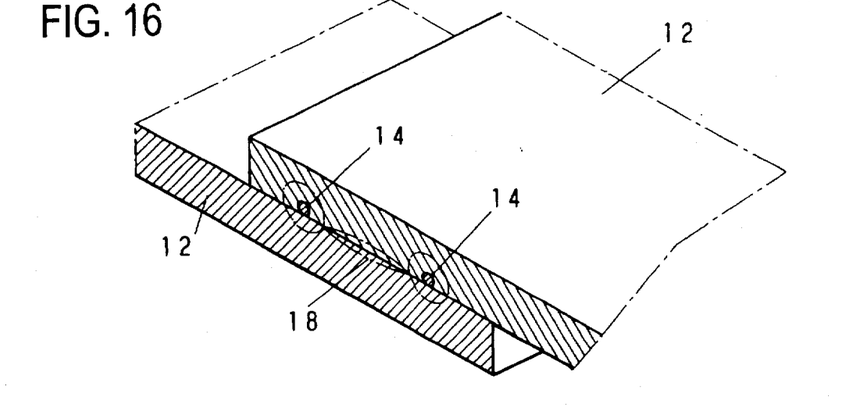
FIG. 16 is a fragmentary perspective view of the plastics sheets that have been welded together in the second mode.

FIG. 11 shows a joint 1 provided in a second embodiment also for use in the first mode of the aforementioned method. This joint has two ridges 3' protruding in opposite directions. Those ridges are adapted for insertion into grooves 3' so as to be welded thereto, with the grooves being formed in ends of considerably thick plastics sheets 2. FIG. 12 shows a modified type of the joint shown in FIG. 11, in which two ears 3" substitute for the ridges 3'. Lateral edges of each sheet 2 will be laid on and welded to those ears 3". Thus, the joint 1 may have weldable portions of any appropriate shape to match any desired combination structure and the welding strength of plastics sheets.

FIGS. 13 to 18 show a second mode of the method proposed herein to directly weld plastics sheets one to another.

In FIGS. 13 to 16 illustrating an example of the second mode, the reference numeral 12 denotes band-shaped sheets made of a plastics. Two electric wires 14 are embedded in and extend along one of opposite lateral sides. Those straight wires 14 each extending a full length of band-shaped sheet are exposed partially to the outside.

A terminal pin 15 soldered to an end of each wire 14 protrudes from one of the ends or shorter sides of each band-shaped sheet 12. Other ends of the two wires 14 protrude from the other shorter side, and are connected one to another to provide a node P'.

The electric wires 14 as the conductive linear members embedded in the sheets may be lengths of 'Nichrome' wire (registered trademark) or the like material for emitting Joule heat.

To prepare such plastics sheets 12, an extruder may be used which has a die of the same cross-sectional shape as the sheets. The electric wires 14 may be inserted in said sheets 12 simultaneously with the extrusion of same.

In the second mode of the method of welding plastics sheets 12 directly one to another, operations will be done in the following manner. At first, one lateral side of one of two plastics sheets 12 will be overlaid on the lateral side of the other sheet, wherein the former side has the electric wires 14, with the latter being deficient thereof. After the two sheets 12 are set in this position, a fusion controller 17 will be operated to supply each wire 14 with a current of desired intensity. Such a current fed through the terminal pin 15 for a predetermined duration will generate Joule heat much enough to melt surface layers of the sheets. These layers are a couple of one side wall 3a in the joint groove 3 and the front edge face of each sheet 2. In this manner, those surface layers in contact with each other will thus be fusion bonded instantaneously over their full length. According to this method, heat is given evenly to all the surface layers contacting one another, so that a high and reliable bonding strength is ensured free of any unbonded regions or zones.

A vacant space 18 will then be formed between the couple of electric wires 14, by forcibly separating the upper sheet 12 from the lower one. A compressed air may be introduced in the space 18 in order to inspect the completeness of fusion bond in longitudinal direction of the welded regions. Alternatively or additionally, a tester may be used to charge a high voltage across the bonded sheet surfaces where the wires 4 are embedded. Irregularity in dielectric characteristics will indicate a defect in fusion bond.

The welding described above and carried out after preparation of the plastics sheets needs only two steps of operation, namely the overlaying of the side edge of one sheet 12 on that of the other 12, and the supplying of an electric current through the wires 14 for several tens of seconds or for a few minutes.

The melting temperature of sheets 12 will vary depending on the material thereof. The length of time required to melt the surface regions of the sheets will also vary depending on thickness thereof and ambient temperature. The controller 17 will thus have to adjust the intensity of electric current as well as the duration thereof. Such a control is also effective to protect the welded regions from heat degradation.

Preferably, electric wires 14 are disposed a proper distance from lateral extremity of each sheet 12. A single electric wire may substitute for the couple of wires 14, and such a wire may be embedded in a meandering manner in one lateral side edge of each sheet so that an entire surface of such region may be molten. Each wire 14, exemplified above as a bare wire, may however be coated with the same plastics as that from which the sheets 12 are made. Those wires 14 may not be embedded fully in the sheet, but may be partially exposed to the outside.

Figure 17:
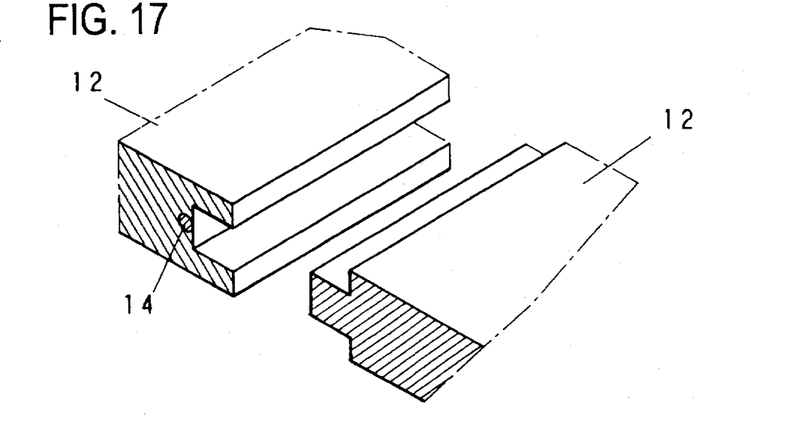
FIG. 17 is a fragmentary perspective view of the plastics sheets to be welded together, without aid of any joint, in another example of the second mode.
Figure 18:
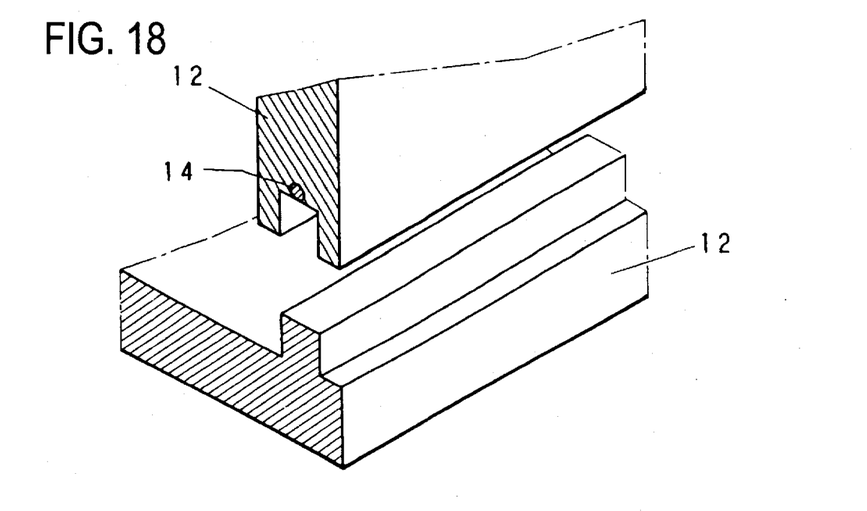
FIG. 18 is also a fragmentary perspective view of the plastics sheets to be welded together, without aid of any joint, in still another example of the second mode.

Although the plastics sheets 12 are overlapped at their lateral edges in an example shown in FIGS. 13 to 16, one of their ends may have an electric wire 14 embedded therein and be butt welded to the end of the other sheet as shown in FIG. 17, or an end of one sheet 12 may be but welded to a lateral edge of the other sheet in a manner shown in FIG. 18.

The method proposed herein can be employed in any mode described above in order to build from unit plastics sheets an extensive watertight sheet such as those used in garbage pits, water reservoirs, swimming pools, office buildings and housings. The method enables thin polyethylene or the like plastics sheets to make a lining for the existing water pipes, oil pipes, gas pipes or air pipes that are made of metals or nonmetals, or to form the insulating tubes for electric wires, wherein those sheets are welded one to another. Plastics panels may also be welded in accordance the method proposed herein to substitute for the conventional metal panels in building a huge tank or the like. The term 'plastics sheets' used in this specification is meant to define and include not only 'sheets' but also 'films', 'panels' or the like.

In summary, one preferable mode of the present invention comprises the steps of preparing plastics sheets having edges to be bonded one to another as well as a plastics joint having at least two weldable regions, the plastics joint also having a conductive linear member embedded through and extending along each weldable region, subsequently placing the edges of the plastics sheets onto the weldable regions of the joint, and finally supplying an electric current to the conductive linear members so as to heat same and thereby fusion bond each plastics sheet edge to the corresponding weldable region of the joint. This method is advantageous in that the plastics sheets or the like are welded one to another with a reduced labor and in a shorter time, such that the sheet's surface regions are heated evenly to afford a reliable high bonding strength.

Another preferable mode of the present invention comprises the steps of preparing plastics sheets mating one another such that one of them having at least one edge to be brought into contact with and to be bonded to an edge of the other sheet, the at least one edge having a conductive linear member embedded in and extending along the edge, subsequently placing the edges of the plastics sheets onto each other, and finally supplying an electric current to the conductive linear members so as to heat same and thereby fusion bond the edges of the plastics sheets one to another.

What is claimed is:

1. A method of welding plastics sheets together comprising the steps of:

preparing at first plastics sheets having edges to be bonded one to another as well as a plastics joint having at least two weldable regions, the plastics joint also having a conductive linear member embedded in and extending along each weldable region from end to end, the conductive linear member for the front surface of the sheet edge and the conductive linear member for the rear surface being disposed in a staggered relationship, such that a bending stress is imparted to regions when the same are fusion bonded, whereby a curved deformation is produced in said regions to improve the welding strength;

subsequently placing the edges of the plastics sheets onto the weldable regions of the joint; and finally supplying an electric current to the conductive linear members so as to heat same and thereby fusion bond each plastics sheet edge to the corresponding weldable region of the joint.

2. A method of welding plastics sheets together comprising the steps of:

preparing at first plastics sheets having edges to be bonded one to another as well as a plastics joint having at least two weldable regions, the plastics joint also having a conductive linear member embedded in and extending along each weldable region from end to end, the conductive linear members being electric wires, the electric wire which is the conductive linear member for the front surface of the sheet edge and the electric wire which is the conductive linear member for the rear surface being disposed in a staggered relationship, such that a bending stress is imparted to regions when the same are fusion bonded, whereby a curved deformation is produced in said regions to improve the welding strength;

subsequently placing the edges of the plastics sheets onto the weldable regions of the joint; and finally supplying an electric current to the conductive linear members so as to heat same and thereby fusion bond each plastics sheet edge to the corresponding weldable region of the joint.

3. A joint made of plastic, band-shaped and having at least two weldable regions that extend along the joint to be welded to plastic sheets and have each a conductive linear member embedded in the weldable region from end to end and capable of being heated by an electric current supplied therethrough, the weldable regions are a pair of U-shaped grooves opening outwards in opposite directions, stoppers being located in each U-shaped groove near end wall thereof.

* * * * *